G. S. NEFF.
Filters.

No. 143,924. Patented Oct. 21, 1873.

Witnesses.
Henry M. Thomas
Henry S. Redfield

Inventor:
Godfrey S. Neff
per R. H. Osgood,
atty.

UNITED STATES PATENT OFFICE.

GODFREY S. NEFF, OF ROCHESTER, NEW YORK.

IMPROVEMENT IN FILTERS.

Specification forming part of Letters Patent No. 143,924, dated October 21, 1873; application filed June 30, 1873.

*To all whom it may concern:*

Be it known that I, GODFREY S. NEFF, of the city of Rochester, in the county of Monroe and State of New York, have invented a certain new and useful Improvement in Filters; and I do hereby declare that the following is a full, clear, and exact description of the construction and operation of the same.

My invention consists in the combination, in a water-filter, of a reservoir and a water-pan made of stone or earthenware, arranged so that the reservoir extends up centrally through the packing in bottle shape, the nozzle of which serves as the air-pipe, and the water-pan serves to center and sustain the same, as will be more fully described.

Figure 1:
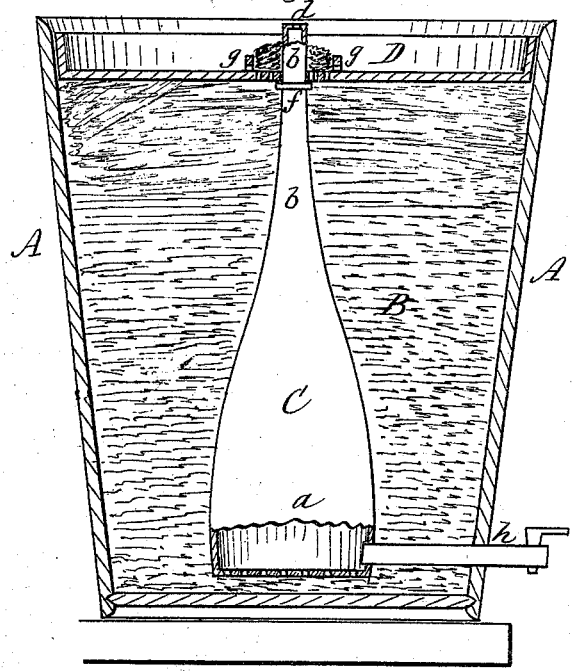
Figure 2:
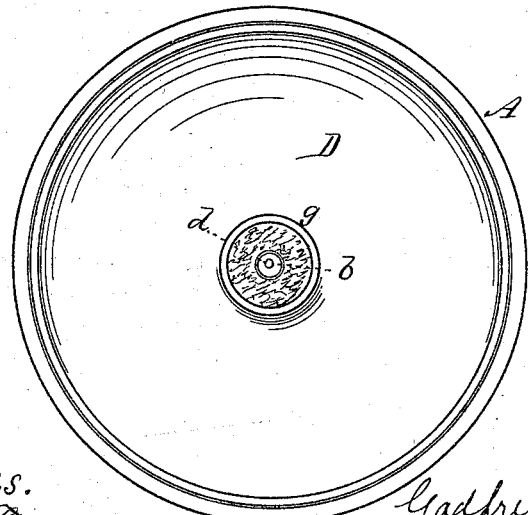

In the drawings, Figure 1 is a central vertical section. Fig. 2 is a plan.

A represents a water-filter of ordinary form and construction, and having the usual packing B. C is the reservoir, and D is the water-pan, which parts are both made of stone or earthenware. In ordinary filters, the reservoir is in the form of a crock, which is embedded and covered by the packing; and a lead pipe connects with it and extends upward, opening through the side of the filter to admit air as the water is drawn off. In place of such an arrangement, I make the reservoir of bottle form, with a body, *a*, which is perforated at the bottom, as usual, to admit the water, and with a neck or nozzle, *b*, which extends up centrally through the packing and to the top of the filter, and serves to admit the air in place of the separate air-pipe before described. The top of the nozzle is closed by a web, with the exception of a small perforation, *d*. A central hole is made through the water-pan for the passage of the nozzle, and the latter is provided, below the pan, with a shoulder or flange, *f*, which helps to keep it in place. The water-pan is also provided with a circular flange, *g*, which forms a sponge-cavity, the bottom and sides of which are perforated to allow the passage of the water. A wooden or other faucet, *h*, of any ordinary construction, may be used to draw off the water. In this filter, the water-pan and reservoir being both made of stone or earthenware, and there being no separate air-pipe, there is no lead, zinc, or other poisonous metallic substance to contaminate the water. The reservoir itself forms the air-pipe. It has a larger capacity than ordinary reservoirs without materially decreasing the amount of the packing, so that a larger quantity of water can be drawn off at once. A special advantage arises from its connection with the water-pan, the latter serving to center and maintain it and prevent it from getting out of position.

Having thus described my invention, I do not claim a filter having a cylindrical reservoir opening to the top, and forming an ice-chamber in combination therewith; but

What I claim, and desire to secure by Letters Patent, is—

The combination, in a filter, of the reservoir C and water-pan D, made of stone or earthenware, when the reservoir is made bottle-shaped, and its nozzle extends through a central hole in the water-pan and forms the air-pipe, as herein shown and described.

In witness whereof I have hereunto signed my name in the presence of two subscribing witnesses.

G. S. NEFF.

Witnesses:
 PETER MYERS,
 R. F. OSGOOD.